Patented June 16, 1953

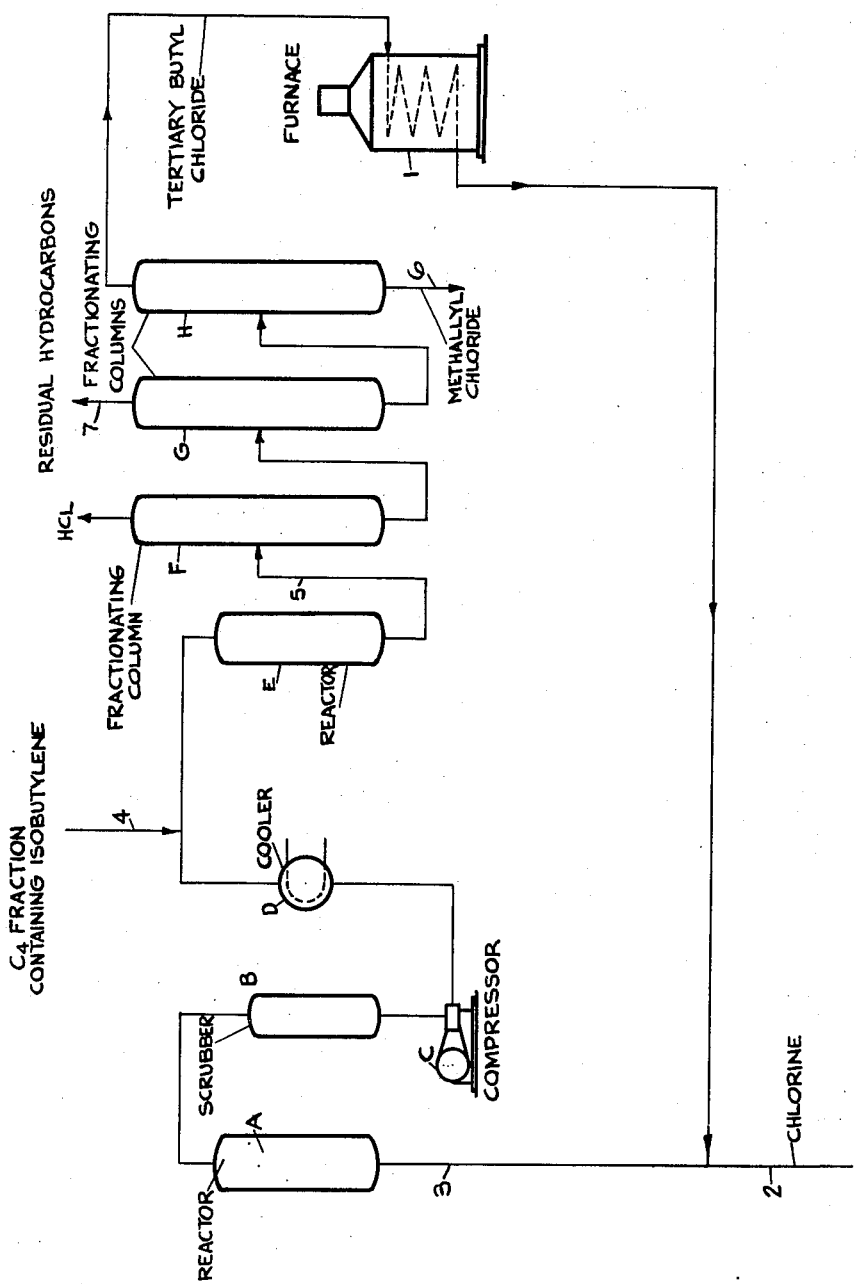

2,642,464

UNITED STATES PATENT OFFICE 2,642,464

PRODUCTION OF METHALLYL HALIDES

Harry A. Cheney, Alasdair W. Fairbairn, and Orris L. Davis, Berkeley, Calif., assignors to Shell Development Company, San Francisco, Calif., a corporation of Delaware Application May 29, 1948, Serial No. 29,966

6 Claims. (Cl. 260—654)

This invention relates to the production of methallyl halides. More particularly the invention relates to a method for the production of methallyl halides from isobutylene or hydrocarbon mixtures containing the same.

More specifically the invention provides a practical and highly economical method for the production of methallyl halides in large yields from isobutylene or hydrocarbon mixtures containing the same which comprises halogenating a tertiary butyl halide, preferably in a preheated condition, at a temperature above 300° C. so as to form methallyl halide and the corresponding hydrogen halide, introducing the resulting mixture, preferably after being cooled, into a stream of isobutylene or hydrocarbon mixture containing the same wherein the hydrogen halide formed in the halogenation reaction combines with the isobutylene to form a tertiary butyl halide, removing the tertiary butyl halide from the reaction mixture and recycling it to the halogenation step and recovering the methallyl halide from the reaction mixture as the desired product.

Methallyl halides have shown promise for a great many fields of utility in industry. Their particular structural characteristics illustrated by the following formula for methallyl chloride:

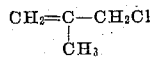

$$CH_2=C-CH_2Cl$$
$$|$$
$$CH_3$$

makes the said compounds especially valuable at the present time in the production of insecticides and synthetic resin material. Many of the potential uses of the methallyl halides have, however, not been exploited due to the high costs involved in their production. Various methods have been employed to produce the desired methallyl halides but they have all met with such technical difficulties or have employed such expensive reactants and equipment, that they have proved entirely unfeasible, in most cases, for the production of the said compounds on a large commercial scale. Direct halogenation, via substitution, of isobutylene is perhaps the most direct process for the production of the methallyl halides but it has been found to have several disadvantages, the most prominent of which is the fact that the isobutylene employed in that process must be in a relatively pure form. The most readily available source of the isobutylene is the hydrocarbon fractions obtained from the distillation of petroleum and natural gas. To obtain the isobutylene in a pure form from this source requires a very complicated and expensive separation process. Furthermore, in this particular direct chlorination process the isobutylene must be maintained in excess resulting in a reactor effluent containing both isobutylene and the hydrogen halide formed in the initial reaction. In order to prevent these two materials from combining to form contaminating by-products the reactor effluent must be quenched rapidly with water. This requires expensive corrosion resistant scrubbing towers and the hydrogen chloride cannot be recovered in the anhydrous state as is frequently desirable. Complete drying of the products is not feasible so that expensive corrosion-resistant equipment must also be employed in the final separation of the product because of the corrosive nature of the wet organic halides. As can readily be seen such difficulties prevent the methallyl halides from being produced on a large commercial scale at the low cost necessary before their many potential uses may be exploited to the fullest extent.

It is an object of the invention, therefore, to provide a practical and highly economical method for the production of methallyl halides. It is a further object of the invention to provide a method for the production of methallyl halides from isobutylene which utilizes a mixture of hydrocarbons containing the isobutylene as stock material for the process. It is a further object to provide a method for production of dry HCl. It is still a further object of the invention to provide a method for the production of methallyl halides from isobutylene which avoids the necessity of using expensive scrubbing towers and corrosion-resistant equipment. It is still a further object of the invention to provide a method for the production of methallyl halides by the halogenation of preheated tertiary butyl halides. It is still a further object to provide a method for the production of methallyl halides from mixtures of hydrocarbons containing isobutylene which does not require the use of catalysts or heat-removing diluents. It is still a further object of the invention to provide a method for the production of a methallyl chloride from isobutylene which yields high, relatively pure yields of the desired product. Other objects of the invention will be apparent from the detailed description given hereinafter.

It has now been discovered that these and other objects may be accomplished by the novel method of the invention which comprises halogenating a tertiary butyl halide preferably in a preheated condition, at a temperature above 300° C., preferably 350° C. to 460° C., so as to form methallyl halide and the corresponding hydrogen halide, introducing the resulting mixture, preferably after being cooled, into a stream of isobutylene or hydrocarbon mixture containing the same wherein the hydrogen halide formed in the halogenation reaction combines with the isobutylene to form a tertiary butyl halide, removing the tertiary butyl halide from the reaction mixture and recycling it to the halogenation step and recovering the methallyl halide from the reaction mixture as the desired product. It has been further discovered that in those cases where the isobutylene is utilized in the reaction in admixture with other hydrocarbons, the residual hydrocarbons recovered from the above process with the excess hydrogen halide may be subjected to a further purification to remove the hydrogen halide, and a hydrocarbon fraction free of isobutylene and adapted for use in the important alkylation processes is obtained.

The economical features of the above-described process such as the utilization of the relatively inexpensive hydrocarbon fractions as the source of the isobutylene, the elimination of the use of scrubbing towers and expensive corrosion-resistant equipment in the removal of the hydrogen halide acids, and the recovery and purification of the products, the rapid continuation of the process without the use of expensive catalysts and heat-removing diluents, the high and relatively pure yields produced by the process, and the adaptation of the residual hydrocarbon by-products for use in alkylation all tend to lower the cost of the production of the methallyl halides and enable the said compounds to be placed on the market in sufficient quantities for a full exploitation of their many uses.

The isobutylene to be used in the process of the invention may be in the pure form or in admixture with other hydrocarbons. The economical features of the present process are more in evidence, however, when mixtures of hydrocarbons containing the isobutylene are used as stock material and they are the preferred materials to be used in the process of the invention. Examples of mixtures of hydrocarbons which may be used as stock material for the present process are those mixtures of hydrocarbons obtained by a pyrolytic treatment or cracking of natural gas, petroleum, petroleum products, coal tar, pitches, peat, shale oil and the like or related carbonaceous material. Mixtures of hydrocarbons obtained from such sources usually contain a great variety of different types of hydrocarbon compounds and in many cases it has been found advisable to separate the mixture roughly, usually by fractional distillation, into fractions containing hydrocarbons of approximately the same number of carbon atoms and to use these separate fractions as stock material for the process of the invention. In the reproduction of the methallyl halide from mixtures of hydrocarbons obtained from the cracking of petroleum, for example, it has been found advisable to first separate from the hydrocarbon mixture a C4 fraction containing the desired isobutylene and to use this fraction as stock material for the reaction. In most cases, however, the fractions used will contain other compounds in addition to the desired isobutylene, e. g. 1-butene, n-butane, isobutane, 1,3-butadiene, cis-2-butene and trans-2-butene. These related compounds contained within the hydrocarbon fractions have, however, been found not to interfere with the production of the methallyl halides by the present process and the isobutylene may be readily introduced into the reaction mixture in admixture with these other hydrocarbons.

Any of the halogens may be used in the execution of the process of the invention to accomplish the desired halogenation. Chlorine, however, is usually preferred as it is more readily available and more easily handled. Examples of the methallyl halides which may be produced by the process of the invention are methallyl chloride, methallyl bromide and methallyl iodide.

The novel process of the invention for the production of the methallyl halides may be broadly described as consisting of three distinct phases or steps. The first step, hereinafter referred to as the halogenation reaction, comprises the halogenation of the tertiary butyl halide at a temperature above 300° C. to produce the desired methallyl halide and the respective hydrogen halide. The next step, hereinafter referred to as the hydrohalogenation reaction, comprises treating and reacting the effluent of the first reaction with isobutylene or mixtures containing it under such conditions that the said isobutylene reacts with the hydrogen halide to produce the tertiary butyl halide. The last step in the process, hereinafter referred to as the separation process, comprises a series of separation processes wherein the excess hydrogen halide and unreacted hydrocarbons contained in the mixture are recovered and preferably retained for future use in alkylation processes, the tertiary butyl halide is recovered and recycled to the initial halogenation step, and the methallyl halide is recovered in relatively pure form as the desired product of the process.

The first step of the process, i. e. the halogenation step, is essentially a high temperature vapor phase reaction and is accomplished at temperatures above 300° C. but usually not higher than 700° C. In general, temperatures ranging from about 350° C. to about 600° C. produce very satisfactory results and they are the preferred temperatures to be used in the halogenation reaction.

To accomplish the halogenation reaction at the specified high temperature in the short reaction period described hereinafter it has been found advisable to vaporize and to preheat the tertiary butyl halide prior to mixing it with the halogen. The temperature to be used in the preheating treatment will depend upon the specific temperature desired during the halogenation reaction, the residence time of the reaction, etc., but the preheating temperature should be so determined as to enable the reaction temperature to be maintained at approximately the required level during the required residence period. In general, preheating temperatures may vary between about 100° C. to about 25° C. below the required halogenation reaction temperature but the exact preheating temperature to be used in each instance may best be determined for each particular case.

For most satisfactory results in the halogenation reaction the tertiary butyl halide should be maintained in molar excess of the halogen. Feed mol ratios of the tertiary butyl halide to the halogen only slightly in excess of 1:1 produce satisfactory results but it is preferred to maintain the mol ratio of tertiary butyl halide to the halogen in excess of 1.5:1. Exceptionally fine results are produced by maintaining the ratios between about 2:1 and about 8:1 and these are the particularly preferred ratios to be used in the halogenation reaction. The lower ratios and particularly those in which the halogenating agent is maintained in excess result in the production of large amounts of heavy-end by-products and the use of such ratios should be avoided if possible. Higher ratios than 8:1 are usually unnecessary in that they result in negligible improvement in yield, but complicate product recovery.

In mixing the tertiary butyl halide with the halogenating agent it has been found advisable to make use of high velocity and turbulent flow to insure a thorough mixing of the reactants before they enter the reaction chamber. A thorough mixing may be accomplished in most instances by bringing the gases together at an angle under pressure. Exceptionally fine results are obtained when the reactants are brought together at an angle of about 135° with the halogen being admitted as the side stream. This procedure, though not essential to the process, is particularly preferred as it insures a thorough, yet rapid mixing of the two reactants and enables the resulting mixture to be carried into the reaction chamber before the halogenation reaction takes place.

The residence time for the halogenation reaction will vary according to the ratio of reactants used, the temperature of reaction, the particular reactants employed, and the like, but under all circumstances the reaction period should not generally exceed a few seconds. In general, the residence time may vary between about 0.1 second and 10 seconds. Reaction periods of over 10 seconds should generally be avoided. Residence periods of between about .5 and 3 seconds are usually preferred.

Atmospheric, superatmospheric or subatmospheric pressure may be used in the halogenation reaction.

In addition to the methallyl halide the products of the high temperature halogenation reaction will comprise the tertiary butyl halide, the corresponding hydrogen halide, small quantities of isobutylene and higher halogenated products. These products are mixed with the stock source of the isobutylene and the resulting mixture is taken to the second reaction chamber to undergo the hydrohalogenation reaction. As the hydrohalogenation reaction is preferably conducted in the liquid phase it is preferred to cool and condense the effluent of the halogenation reaction so that a substantial portion is in the liquid phase before it is mixed with the stock source containing the isobutylene. The condensation may be accomplished by any suitable chemical or mechanical means such as refrigeration and internal cooling agents. In some cases it may be desirable to compress the effluent of the halogenation reaction to aid in condensation.

The pure isobutylene or the hydrocarbon mixture containing it may be introduced into the stream of reaction products of the halogenation reaction as a gas but as the hydrohalogenation reaction is to be accomplished in the liquid phase, it is preferred to introduce the isobutylene or the mixture containing it in the liquid form.

The rate of introducing the isobutylene into the stream of reaction products of the halogenation reaction may be varied over a considerable range depending upon the concentration of the hydrogen halide in the reaction products. To avoid the production of cumbersome amounts of reaction mixture, especially in those instances where the isobutylene is being introduced in a hydrocarbon fraction, it has been found advisable to maintain the hydrogen halide in molar excess of the isobutylene. The reaction proceeds very satisfactorily, however, in those cases where the isobutylene is maintained in excess. Satisfactory results are obtained when the mole ratio of the hydrogen halide to the isobutylene is maintained between about 1:1 and about 4:1. Particularly preferred mole ratios of the hydrogen halide to the isobutylene are those between about 1:1 and about 3:1. In continuous cyclic operation isobutylene need only be introduced in sufficient quantity to produce tertiary butyl halide at the rate at which it is consumed in the chlorination reactor, this will ordinarily result in a mole ratio of about 2:1.

Mixing of the isobutylene or mixtures containing it with the effluent of the halogenation reaction need not take place before they enter the reaction chamber. The two streams may if desired be introduced separately to the hydrochlorination reaction chamber.

In the second reaction chamber the hydrogen halide contained in the effluent of halogenation reaction reacts with the isobutylene to produce the tertiary butyl halide. This hydrohalogenation reaction may be generally represented by the equation below showing the production of tertiary butyl chloride from isobutylene:

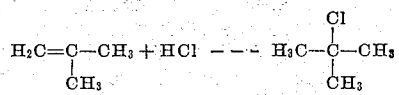

This hydrohalogenation reaction is an exothermic reaction producing large quantities of heat. In some cases the reaction may be carried out adiabatically with the heat of reaction being absorbed by the reactor contents. If desired heat may be removed from the reaction zone by means of internal or external cooling coils or by other methods.

The hydrohalogenation reaction proceeds satisfactorily at any temperature below about 300° C. providing the reaction medium is maintained in the liquid phase. The reaction is known to take place even at temperatures as low as −80° C. but the preferred temperatures are from about −40° C. to about 80° C.

The pressure used in the hydrohalogenation reaction should be at least sufficient to maintain a substantial proportion of the reaction mixture in the liquid phase. Extremely high pressures such as those in excess of 700 to 800 pounds per square inch, in general, add little to the efficiency of the reaction and should be avoided for economical reasons. Particularly preferred pressures to be used in the hydrohalogenation reaction are those between about 25 pounds per square inch and about 200 p. s. i.

Catalysts, promotors or inhibitors may be employed in the execution of the hydrohalogenation reaction, if desired, but they are usually not necessary as the reaction proceeds very smoothly under the above specified conditions to produce the desired results.

The residence time for the hydrohalogenation reaction will vary according to the ratio and particular type of reactants employed, and the quantity of other materials present. In general, the residence time may vary from 10 seconds to about 200 seconds. Preferred residence periods vary between about 20 seconds and 100 seconds.

The products of the hydrohalogenation reaction will consist of the desired methallyl halide, tertiary butyl halide, the residual hydrocarbons remaining from the hydrocarbon fraction if the isobutylene was introduced in a mixture, excess hydrogen halide and small quantities of higher halogenated materials. In the third and final step of the process these products are separated into the desired fractions; residual hydrocarbons being separated and, if desired, put in suitable form for use, for example, in alkylation processes, the tertiary butyl halide being separated and recycled to the initial halogenation step, and the methallyl halide being separated as the desired product of the process of the invention.

The separation of the products of the hydrohalogenation reaction may be accomplished by any suitable means. A preferred method is to subject the effluent of the hydrohalogenation reaction to a series of fractional distillations wherein the desired products are removed as separate fractions. By the preferred fractionation method the excess hydrogen halide and residual hydrocarbons are first removed overhead, and the higher boiling tertiary butyl halide is next removed overhead leaving the methallyl halide in the bottoms of the distillation. The methallyl halide is then recovered from the final separation and is obtained in a very high yield. It may be used directly for many commercial purposes without further purification. The residual hydrocarbons recovered from the first separation, however, are preferably scrubbed or further purified to remove the hydrogen halide before they are used for feed to alkylation processes.

The apparatus used in the process of the invention may be of any suitable construction or material so as to enable each of the specified steps to be accomplished according to the above-described specified conditions. The reaction chamber used in the halogenation step should be of such structure as to maintain and withstand the desired high temperatures involved.

The process of the invention may be conducted in a batchwise, continuous or semi-continuous manner. The process is well adapted to, and preferably conducted as, a continuous process wherein the hydrohalogenated addition product (tertiary butyl halide) recovered at the end is recycled back to the initial halogenation step.

To illustrate more or less diagrammatically how the novel process of the invention may be applied to the production of the methallyl halides, reference is made to the accompanying drawing showing an assemblage of apparatus for the production of methallyl chloride from a butane-butylene fraction obtained by the cracking of petroleum oil. The drawing is attached as an example only and should not be considered as limiting the invention in any way.

Referring now to the drawing, tertiary butyl chloride, preferably obtained from a previous operation of the process of the invention, is preheated in furnace 1 and the resulting product is brought into contact with a stream of chlorine from line 2. The flow of chlorine is measured so that preferably about 1 mole of chlorine is introduced for about 3.5 to 4.5 moles of preheated tertiary butyl chloride.

The mixed reactants pass through a conduit 3 to reactor A which may be constructed of mild steel or other heat resistant material and which is preferably of such a volume that the average time of residence of the reactants therein is about 2 seconds. On substantial completion of the chlorination in reactor A the products of reaction are cooled at scrubber B, compressed at compressor C and further cooled at D. The reaction products are then mixed with a stream of the C$_4$ butane-butylene mixture from conduit 4. The total mixture is thence taken to reactor E which is cooled by some suitable means such as water condenser to remove the heat of reaction formed by the addition of the hydrogen chloride to the isobutylene. After completion of reaction which is generally accomplished in about 1 to 2 minutes the products of the reactor E are taken through conduit 5 to fractionating tower F where the HCl is removed overhead. The bottoms are taken to fractionating tower G where the residual hydrocarbons are taken off overhead. Methallyl chloride is recovered through conduit 6 at the bottom of tower H, and tertiary butyl chloride is taken off overhead and recycled to the furnace. The residual hydrocarbons removed through conduit 7 are subjected to further purification to render them suitable for use in alkylation processes.

To illustrate further how the invention may be carried out the following working examples are given. It is to be understood, however, that as in the case of the attached drawing the examples are for the purpose of illustration, and reactants and conditions for reaction employed therein are not to be considered as limiting the invention in any way.

*Example I*

Methallyl chloride is produced according to the process of the invention with an assemblage of apparatus similar to that disclosed in the drawing. Chlorine from a storage tank is metered into a mixing zone. Tertiary butyl chloride is passed through a furnace where the temperature of the vapor is brought to about 390° C. The hot vapor is then mixed with chlorine in the ratio of about 3.9 moles of preheated tertiary butyl chloride per mole of chlorine. After mixing, the reactants are passed into a tubular reactor enclosed in a resistance furnace. Here the reactants are maintained at a temperature of about 462° C. for a residence period of about 0.84 second. The reaction products are cooled, condensed, and further cooled as shown in the drawing. A stream of liquid isobutylene is then mixed with the cooled reaction products. The isobutylene feed rate is regulated so that there are about 1.26 moles of hydrogen chloride for every mole of isobutylene in the mixture. After the mixing the reactants are passed into a tubular reactor surrounded by a water jacket. Here the temperature is lowered by means of water cooling, and the reaction is allowed to take place at about 30° C. Residence time for the reaction is about 29 seconds and reaction of isobutylene is essentially complete. The reaction products are separated by means of a series of fractional distillations. The excess hydrogen chloride is taken off first under pressure. The residual hydrocarbons are taken off at the next tower. In the third tower the tertiary butyl chloride is taken off overhead and methallyl halide is removed at the bottom. Further fractionation of the bottoms produces pure methallyl chloride which is obtained in a yield of 94% based on the consumption of chlorine. That is, 0.94 gram-mols of methallyl chloride are obtained per gram-mols of chlorine consumed in the chlorination step.

*Example II*

Chlorine vapor from a storage tank is metered into a mixing zone. Tertiary butyl chloride is passed through a furnace where the temperature is brought to about 290° C. The hot vapor is then mixed with chlorine in the ratio of about 1 mole of chlorine per 1.6 moles of tertiary butyl chloride. After mixing, the reactants are passed into a thermally insulated tubular reactor. Here the reactants attain a temperature about 460° C. for a residence time of about 0.68 second. The reaction products are cooled, condensed and further cooled. A stream of liquid C₄ hydrocarbons containing about 16.6 mole per cent isobutylene is then mixed with the cooled reaction product. The entrance of the liquid hydrocarbons is regulated so that there are about 1.24 moles of hydrogen chloride for every mole of isobutylene in the mixture. After mixing, the reactants are passed into a tubular reactor surrounded by a water jacket. Here the reaction temperature is lowered by means of cooling, and the reaction is allowed to take place at about 50° C. Residence time for the reaction is about 54 seconds, and reaction of isobutylene is essentially complete. The reaction products are separated by means of a series of fractional distillations. The excess hydrogen chloride and residual hydrocarbons contained in the C₄ fraction are taken off overhead in separate towers. The tertiary butyl chloride is then taken off overhead in the third tower. The methallyl chloride remains in the bottoms and is recovered in pure form by further fractionation in a yield of 91% based on the consumption of chlorine.

Other yields obtained under various conditions of operation using C₄ fractions as source of isobutylene are shown in the following table:

| Molar Ratio Tertiary Butyl Chloride to Chlorine | Chlorination Temperature, °C. | Residence Time for Halogenation Reaction, Sec. | Molar Ratio of HCl to Isobutylene | Temp., °C. | Residence Time for Hydrohalogenation Reaction, Sec. | Percent Yield Methallyl Chloride based on Chlorine Consumption |
|---|---|---|---|---|---|---|
| 3.6 | 365 | 1.1 | 1.08 | 30 | 100 | 86 |
| 2 | 440 | 2.8 | 1.13 | 55 | 56 | 94 |
| 1.6 | 460 | .7 | 1.21 | 50 | 54 | 96 |

*Example III*

Tertiary butyl bromide vapor is preheated to a temperature of 300° C. and mixed with bromine vapor in the ratio of about 3.5 moles of tertiary butyl bromide per mole of bromine. After mixing, the reactants are passed into a tubular reactor enclosed in a resistance furnace. Here the reactants are maintained at a temperature between about 400° C. and about 460° C. for a residence period of about 2 seconds. The reaction products are cooled, condensed and further cooled. A stream of liquid C₄ hydrocarbons containing about 16.6 moles per cent isobutylene is then mixed with the reaction products of the halogenation reaction. The entrance of the liquid hydrocarbons is regulated so that there are about 1.5 moles of hydrogen bromide for every mole of isobutylene in the mixture. After mixing, the reactants are passed into a tubular reactor surrounded by a water jacket. Here the reaction temperature is lowered by means of water cooling and reaction is allowed to take place at about 50° C. Residence time for the reaction is about 80 seconds. The reaction products are separated by means of a series of fractional distillations. The excess hydrogen bromide and the residual hydrocarbons contained with the C₄ fraction are taken off first. The tertiary butyl bromide is then taken off overhead and the methallyl bromide remains in the bottoms.

We claim as our invention:

1. A process for the production of methallyl chloride which comprises preheating tertiary butyl chloride to 390° C., reacting the resulting product with chlorine in mole ratio of about 4 to 1 at 460° C. for a period of about 1 second, cooling and compressing the reaction mixture and introducing it into a stream of isobutylene at such a rate that the hydrogen chloride contained in the reaction mixture and the added isobutylene are in the mole ratio of about 2 to 1, allowing the resulting mixture to react in the liquid phase at 40° C. for a period of about 55 seconds whereby isobutylene is hydrochlorinated to tertiary butyl chloride, subjecting the resulting mixture to fractional distillation and removing the excess hydrogen chloride overhead, subjecting the bottoms of the distillation to another fractional distillation and removing tertiary butyl chloride overhead, recycling the tertiary butyl chloride to the preheating step, and recovering methallyl chloride from the bottoms of the last fractionation.

2. A process for the production of methallyl chloride which comprises preheating tertiary butyl chloride and reacting the resulting product with chlorine in mole ratio of about 4 to 1 at a temperature of about 460° C. for a period of between 0.5 second and 3 seconds, cooling the reaction mixture and introducing it into a stream of C₄ hydrocarbons containing isobutylene at such a rate that the hydrogen chloride contained in the reaction mixture and the added isobutylene are in a mole ratio of about 2 to 1, treating the resulting mixture in the liquid phase at a temperature of about 40° C. for a reaction period of between about 20 and 100 seconds whereby isobutylene is hydrochlorinated to tertiary butyl chloride, subjecting the effluent of this hydrochlorination treatment to fractional distillation to remove the excess hydrogen chloride overhead and subjecting the bottoms to a second distillation to remove the residual hydrocarbons overhead and subjecting the bottoms of the second distillation to another fractional distillation to remove the tertiary butyl chloride overhead, recycling the tertiary butyl chloride to the preheat step, and recovering the methallyl chloride from the bottoms of the last fractionation.

3. A process for the production of methallyl chloride which comprises preheating tertiary butyl chloride and reacting the resulting product with chlorine in mole ratio between about 2 to 1 and about 8 to 1 at a temperature between about 300° C. and 700° C. within 0.1 to 10 seconds, cooling the reaction mixture and introducing it into a stream of C₄ hydrocarbons containing isobutylene at such a rate that the hydrogen chloride contained in the reaction mixture and the added isobutylene are in a mole ratio of between about 1 to 1 and 4 to 1, treating the resulting mixture in the liquid phase at a temperature of between about −40° C. and 80° C. within about 20 seconds to 100 seconds whereby isobutylene is hydrochlorinated to tertiary butyl chloride, subjecting the effluent of the hydrochlorination treatment to fractional distillation to remove the excess hydrogen chloride overhead and subjecting the bottoms to a second distillation to remove the residual hydrocarbons overhead and subjecting the tertiary butyl chloride-containing bottoms of the second distillation to another fractional distillation to remove the tertiary butyl chloride overhead, recycling the tertiary butyl chloride to the preheat step, and recovering the methallyl chloride from the bottoms of the last fractionation.

4. A process for the production of methallyl bromide which comprises preheating tertiary butyl bromide and reacting the resulting product with bromide in mole ratio of between about 2 to 1 and about 8 to 1 at a temperature between about 400° C. and 550° C., for a period of between 0.5 second and 3 seconds, cooling the reaction mixture and introducing it into a stream of C4 hydrocarbons containing isobutylene at such a rate that the hydrogen bromide contained in the reaction mixture and the added isobutylene are in a mole ratio between about 1 to 1 and 4 to 1, reacting the resulting mixture in the liquid phase at a temperature of between about 30° C. and 50° C. for a residence period of not more than 200 seconds whereby the isobutylene is hydrobrominated to tertiary butyl bromide, subjecting the effluent of the hydrobromination reaction to a fractional distillation to remove the excess hydrogen bromide, subjecting the bottoms of the first fractional distillation to another fractional distillation to remove the residual hydrocarbons overhead and subjecting the bottoms of this second distillation to a third distillation to remove the tertiary butyl bromide overhead, recycling the tertiary butyl bromide distillate to the preheating step, and recovering the methallyl bromide from the bottoms of the last fractional distillation.

5. A process for the production of a methallyl halide of the group consisting of methallyl chloride and methallyl bromide which comprises preheating a tertiary butyl halide of the group consisting of tertiary butyl chloride and tertiary butyl bromide, which tertiary butyl halide contains the same type halogen atom as the desired methallyl halide product, and reacting the resulting product with a halogen corresponding to the halogen atom in the tertiary butyl halide in a mole ratio of between about 2 to 1 and 8 to 1 at a temperature above 300° C. within about .5 second to 3 seconds, cooling the reaction mixture and introducing it into a stream of hydrocarbons containing isobutylene at such a rate that the hydrogen halide in the reaction mixture and the added isobutylene are in a mole ratio of between about 1 to 1 and 4 to 1, reacting the resulting mixture in the liquid phase at a temperature below 300° C. and above −80° C. for a period of not more than 200 seconds whereby isobutylene is hydrohalogenated to tertiary butyl halide, subjecting the effluent of the hydrohalogenation treatment to fractional distillation to remove the excess hydrogen halide overhead and subjecting the bottoms to a second distillation to remove the residual hydrocarbons overhead and subjecting the tertiary butyl halide-containing bottoms of the second distillation to another fractional distillation to remove the tertiary butyl halide overhead, recycling the tertiary butyl halide distillate to the preheat step, and recovering the methallyl halide from the bottoms of the last fractionation.

6. A process for producing a methallyl halide which comprises preheating a tertiary butyl halide of the group consisting of tertiary butyl chloride and tertiary butyl bromide, reacting a molar excess of the said preheated tertiary butyl halide with a halogen corresponding to the halogen in the said tertiary butyl halide at a temperature above 300° C. for a period between about .1 second to 10 seconds, cooling the resulting mixture and mixing it with a hydrocarbon stream containing isobutylene at such a rate that the hydrogen halide in the said reaction mixture and the added isobutylene are in a mole ratio between about 1 to 1 and 4 to 1, reacting the resulting mixture in the liquid phase at a temperature below 300° C. but above −80° C. for a period not in excess of 200 seconds whereby isobutylene is hydrohalogenated to tertiary butyl halide, subjecting the effluent of the hydrohalogenation reaction to a series of distillations to separate out the excess hydrogen halide, the residual hydrocarbons, the tertiary butyl halide and the methallyl halide, recycling the tertiary butyl halide to the preheat step, and recovering the methallyl halide as the desired product.

HARRY A. CHENEY.
ALASDAIR W. FAIRBAIRN.
ORRIS L. DAVIS.

References Cited in the file of this patent

UNITED STATES PATENTS

| Number | Name | Date |
|---|---|---|
| 2,069,624 | Prutton et al. | Feb. 2, 1937 |
| 2,389,230 | Blumer | Nov. 20, 1945 |
| 2,410,647 | Fleming et al. | Nov. 5, 1946 |

FOREIGN PATENTS

| Number | Country | Date |
|---|---|---|
| 259,192 | Germany | Apr. 23, 1913 |
| 890,316 | France | Nov. 2, 1943 |